(12) United States Patent
Matsushita

(10) Patent No.: US 11,135,891 B2
(45) Date of Patent: Oct. 5, 2021

(54) STABILIZER BUSHING

(71) Applicant: SUMITOMO RIKO COMPANY LIMITED, Komaki (JP)

(72) Inventor: Toru Matsushita, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 16/831,396

(22) Filed: Mar. 26, 2020

(65) Prior Publication Data

US 2020/0307345 A1 Oct. 1, 2020

(30) Foreign Application Priority Data

Mar. 28, 2019 (JP) .............................. JP2019-062714

(51) Int. Cl.
*B60G 21/055* (2006.01)
*F16F 1/373* (2006.01)

(52) U.S. Cl.
CPC ........ *B60G 21/0551* (2013.01); *F16F 1/3735* (2013.01); *B60G 2204/1222* (2013.01); *B60G 2204/41* (2013.01); *B60G 2206/821* (2013.01)

(58) Field of Classification Search
CPC ............ B60G 21/0551; B60G 2204/41; B60G 2204/1222; B60G 2204/1224; B60G 2204/41043; B60G 21/055; F16F 1/3735; F16F 1/3876; F16F 1/16
See application file for complete search history.

(56) References Cited

U.S. PATENT DOCUMENTS

| | | | | |
|---|---|---|---|---|
| 5,085,535 | A * | 2/1992 | Solberg ................ | B26D 7/2621 403/13 |
| 6,241,225 | B1 * | 6/2001 | Krause ............... | B60G 21/0551 267/292 |
| 8,292,312 | B2 | 10/2012 | Kato et al. | |
| 8,424,891 | B2 | 4/2013 | Nagai et al. | |
| 9,393,852 | B2 * | 7/2016 | Kobayashi ......... | B60G 21/0551 |
| 2006/0091595 | A1 * | 5/2006 | Hayashi ............. | B60G 21/0551 267/276 |

(Continued)

FOREIGN PATENT DOCUMENTS

| | | |
|---|---|---|
| JP | 6257353 B2 | 1/2018 |
| JP | 2018-34666 A | 3/2018 |

(Continued)

*Primary Examiner* — Paul N Dickson
*Assistant Examiner* — Maxwell L Meshaka
(74) *Attorney, Agent, or Firm* — Oliff PLC

(57) ABSTRACT

A stabilizer bushing including: a stabilizer bar; and two semi-tubular elastic half bodies each including an intermediate plate fitting of semicircular arc shape embedded therein. The elastic half bodies are bonded to an outer circumferential surface of the stabilizer bar such that two circumferential end faces thereof are mutually butted. The plate fitting is embedded in an axial direction. A notch-shaped recess is provided in a corner of axial ends of the circumferential end faces of each elastic half body. The recess extends in a radial direction of the elastic half body and opens onto an inner circumferential surface thereof, and a corner of axial ends of circumferential end portions of the plate fitting is exposed at the recess. A bottom corner of the recess extending in the radial direction of the elastic half body has a curved-concave inner surface shape.

4 Claims, 6 Drawing Sheets

(56) References Cited

U.S. PATENT DOCUMENTS

| | | | | |
|---|---|---|---|---|
| 2011/0291377 A1* | 12/2011 | Kato | ................... | B60G 21/0551 |
| | | | | 280/124.107 |
| 2012/0024463 A1* | 2/2012 | Grundmeier | ........ | B29C 66/1122 |
| | | | | 156/91 |
| 2014/0265076 A1* | 9/2014 | Weger | ..................... | F16L 3/243 |
| | | | | 267/141 |
| 2015/0008630 A1* | 1/2015 | Ishimatsu | .......... | B60G 21/0551 |
| | | | | 267/279 |
| 2018/0141402 A1* | 5/2018 | Oh | ..................... | B60G 21/0551 |

FOREIGN PATENT DOCUMENTS

| | | | | |
|---|---|---|---|---|
| JP | 2018079784 A | * | 5/2018 | ......... B60G 21/0551 |
| JP | 2018-111332 A | | 7/2018 | |
| JP | 2018111334 A | * | 7/2018 | |

* cited by examiner

STABILIZER BUSHING

INCORPORATED BY REFERENCE

The disclosure of Japanese Patent Application No. 2019-062714 filed on Mar. 28, 2019 including the specification, drawings and abstract is incorporated herein by reference in its entirety.

BACKGROUND OF THE INVENTION

1. Field of the Invention

The present invention relates to a stabilizer bushing for supporting a stabilizer bar with respect to a vehicle body in a vibration damping manner, and more particularly to an adhesive-type stabilizer bushing that is bonded and attached to a stabilizer bar.

2. Description of the Related Art

Conventionally, in vehicles such as automobiles, a stabilizer bar has been used to improve driving stability by suppressing the inclination of the vehicle body at the time of turning or the like. With the stabilizer bar inserted through a stabilizer bushing of generally tubular shape overall, the stabilizer bar is supported in a vibration-damping manner on the vehicle body via the stabilizer bushing. For example, Japanese Unexamined Patent Publication No. JP-A-2018-111332 discloses that half-structured first and second semi-tubular bodies are externally placed about a stabilizer bar with the stabilizer bar interposed between butted faces of the semi-tubular bodies. Each inner circumferential surface of the first and second semi-tubular bodies is bonded and attached to the outer circumferential surface of the stabilizer bar.

The first and second semi-tubular bodies each include a semi-tubular fitting fixed in an embedded state to the middle portion in the thickness direction. This makes it possible to adjust spring characteristics of the stabilizer bushing. Also, a compression force applied from the outer circumferential surfaces of the first and second semi-tubular bodies during bonding to the stabilizer bar can be efficiently exerted as a pressing force against the outer circumferential surface of the stabilizer bar.

SUMMARY OF THE INVENTION

Here, the inventor has examined further improvement of the performance of the conventional adhesive-type stabilizer bushing as described above. Specifically, for example, further improvement of reliability of the bonding state to the stabilizer bar, further improvement of durability in the mounted state, and the like were examined.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides a stabilizer bushing comprising: a stabilizer bar; and two elastic half bodies of semi-tubular shape each including an intermediate plate fitting of semicircular arc shape embedded therein, the elastic half bodies being bonded and attached to an outer circumferential surface of the stabilizer bar such that two circumferential end faces of the elastic half bodies are butted at each other, wherein the intermediate plate fitting is in an embedded state in an axial direction in each elastic half body, a recess of notch shape is provided in a corner of axial ends of the circumferential end faces of each elastic half body, the recess extending in a radial direction of the elastic half body and opening onto an inner circumferential surface thereof, and a corner of axial ends of circumferential end portions of the intermediate plate fitting is exposed at the recess, and a bottom corner of the recess extending in the radial direction of the elastic half body has an inner surface shape of curved concave.

As a result of repeated examinations by the inventor about the conventional adhesive-type stabilizer bushing, it has been found that, with respect to the reliability of bonding to the stabilizer bar and the durability under the mounted state, there is room for improvement in two axial end portions of the stabilizer bushing. In particular, there is room for further improvement at the butted portions in the two circumferential end portions of the first and second elastic half bodies having the half structure. In addition, as a result of further examination, it has been found that a recess is formed in the two axial end portions of the first and second elastic half bodies by a positioning convex part provided to a mold for positioning the intermediate plate fitting during molding of the first and second elastic half bodies, and at the formation site of the said recess, there is room for examination of improvement of the reliability of bonding to the stabilizer bar and the durability under the mounted state.

Then, the inventor repeated the research and obtained the following findings. That is, since the positioning sites of the intermediate plate fitting of semicircular arc shape are four corners, the recesses are often formed by the positioning parts so as to be located at the butted portions of the two circumferential ends of the first and second elastic half bodies as well as at two axial end portions thereof. Therefore, at the axial end where the free surface due to the axial end face is already larger than the center portion, not only an increase of the free surface due to the butted faces at the two circumferential ends of the first and second elastic half bodies, but also an increase of the free surface due to the recesses formed by the positioning parts of the intermediate plate fitting is added. Moreover, since the positioning part of the intermediate plate fitting has a rectangular projection shape as shown in JP-A-2018-111332, the recess has an inner surface shape in which two flat orthogonal surfaces intersect at a right angle at the bottom. As a result, when a pushing force is applied in the direction of butting of the first and second semi-tubular bodies at the time of bonding to the stabilizer bar, the pushing force escapes due to swelling of the two flat orthogonal surfaces of the recess, making it difficult to transmit the pushing force as a pressing force against the outer circumferential surface of the stabilizer bar. This reached the following findings that that there was room for technical improvement in this respect. In addition, on the inner surface of the recess where the two flat orthogonal surfaces intersect, since local stress and strain have already occurred at the time of bonding to the stabilizer bar, there is room for improving the stress and strain in the mounted state. Besides, it was found out that, since it is difficult to apply the effective pushing force to the bonding surface to the stabilizer bar, there is still room for improvement in reducing tensile stress generated by the action of external force as well.

With the stabilizer bushing having the structure according to the present preferred embodiment made based on such findings, the bottom corner of the recess formed by the positioning part of the intermediate plate fitting at the time of molding has an inner surface shape of curved concave. This makes it possible to effectively obtain positioning action of the intermediate plate fitting while increasing the volume of the elastic body. Moreover, as will be described in detail in the practical embodiment, by transmitting the compression force applied in the direction of butting of the first and second elastic half bodies to the radially inner side along the curved inner surface of the recess, it is possible to suppress the swelling deformation of the inner surface of the recess to the axial outside and to efficiently obtain the pushing force against the surface of the stabilizer bar. Besides, the localized concentration of stress and strain on the inner surface of the recess can be effectively avoided. As a result, the stabilizer bushing having the structure according to the present preferred embodiment is able to improve and stabilize the bonding force to the stabilizer bar, as well as to improve the durability under the mounted state.

A second preferred embodiment provides the stabilizer bushing according to the first preferred embodiment, wherein the recess opens only onto the inner circumferential surface of the elastic half body.

According to the stabilizer bushing structured following the present preferred embodiment, the rubber volume of the elastic half body may be improved, and it is not necessary to hold the outer circumferential surface of the intermediate plate fitting having a curved convex surface with a mold. Thus, the shape and structure of the mold can be simplified.

A third preferred embodiment provides the stabilizer bushing according to the first or second preferred embodiment, further comprising a second recess of notch shape provided at the axial ends of a circumferentially middle portion of each elastic half body that includes the recess, the second recess extending in the radial direction of the elastic half body and opening onto the inner circumferential surface thereof, wherein an axial end of a circumferentially middle portion of the intermediate plate fitting is exposed at the second recess, and a bottom part of the second recess extending in the radial direction of the elastic half body has an inner surface shape of curved concave.

According to the stabilizer bushing structured following the present preferred embodiment, in the cavity of the mold for molding, the intermediate plate fitting can also be supported at the circumferentially middle portion exposed in the second recess. Besides, since the bottom part of the second recess has the inner surface of curved concave, similar to the above-mentioned recess of notch shape, the localized concentration of stress and strain in the second recess can be reduced, thereby obtaining excellent durability.

A fourth preferred embodiment of the present invention provides the stabilizer bushing according to any of the first to third preferred embodiments, two circumferential end portions of each elastic half body projects in a circumferential direction further than the circumferential ends of the intermediate plate fitting, and an amount of projection in the circumferential direction is larger on a radially inner side than on a radially outer side of a radially middle portion where the intermediate plate fitting is positioned.

With the stabilizer bushing structured following the present preferred embodiment, due to the compression force applied in the direction of butting of the first and second elastic half bodies, the two circumferential end portions of the elastic half body readily deforms so as to swell toward the radially inner side rather than the radially outer side, thereby easily obtaining a larger pushing force against the outer circumferential surface of the stabilizer bar. In particular, the bottom inner surface of curved concave of the recess according to the first preferred embodiment suppresses the swelling of the two axial end portions of the butted faces of the first and second elastic half bodies to the axial outside. In cooperation therewith, at the butted portions of the first and second elastic half bodies which were likely to cause a problem in the stabilizer bushing of the conventional structure, further increase in working effects of improvement of the bonding force to the stabilizer bar and improvement of the durability can be achieved.

According to the present invention, with the adhesive-type stabilizer bushing including the intermediate plate fitting embedded therein, it is possible to improve the reliability of bonded state to the stabilizer bar, as well as to further improve the durability due to amelioration of the localized concentration of stress and strain.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein:

FIGS. 8A-8C are views suitable for explaining a specific example of a manufacturing method of the elastic half body shown in FIG. 2, wherein FIG. 8A is a view showing a state in which the intermediate plate fitting is set in a mold for molding, FIG. 8B is a view showing a state in which the mold shown in FIG. 8A is filled with a rubber material, and is a cross sectional view taken along line 8B-8B of FIG. 8C, and FIG. 8C is a cross sectional view taken along line 8C-8C of FIG. 8B.

DETAILED DESCRIPTION OF EMBODIMENTS

Hereinafter, in order to clarify the present invention more specifically, a practical embodiment of the present invention will be described in detail in reference to the drawings.

Figure 1:
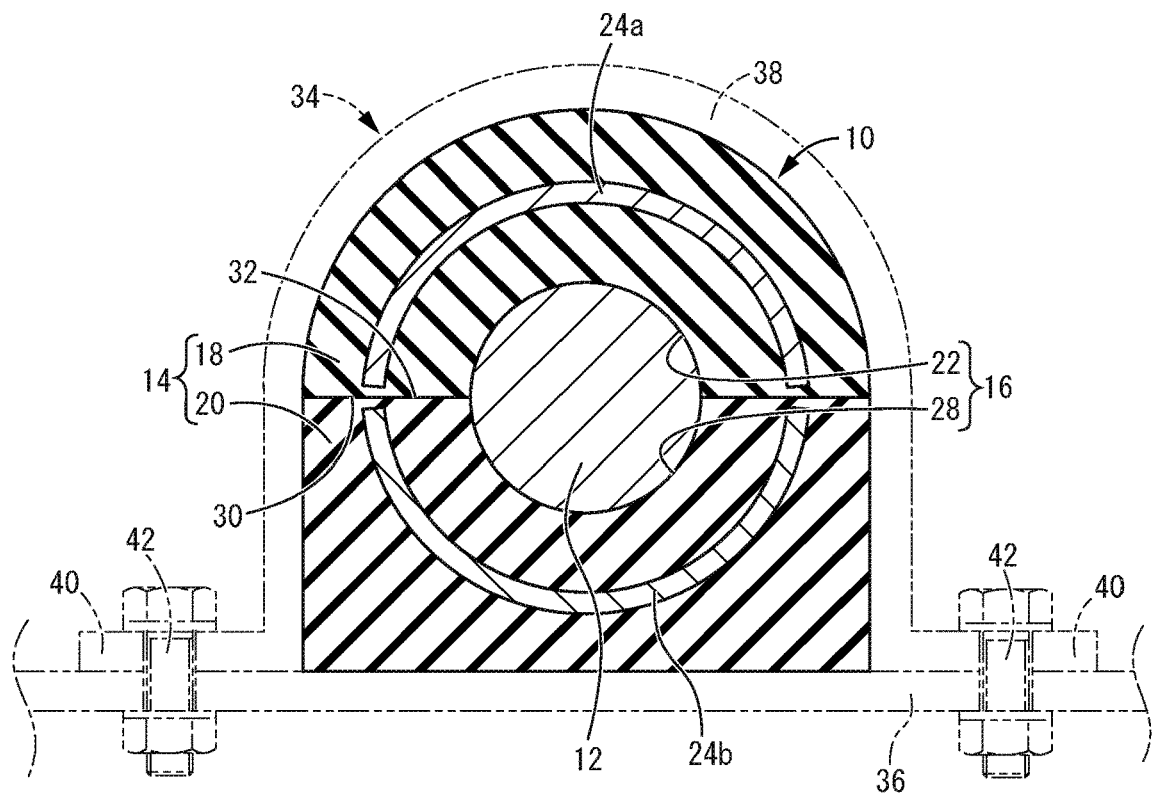
FIG. 1 is a transverse cross sectional view showing a stabilizer bushing as a first practical embodiment of the present invention in a mounted state on a vehicle.
Figure 2:
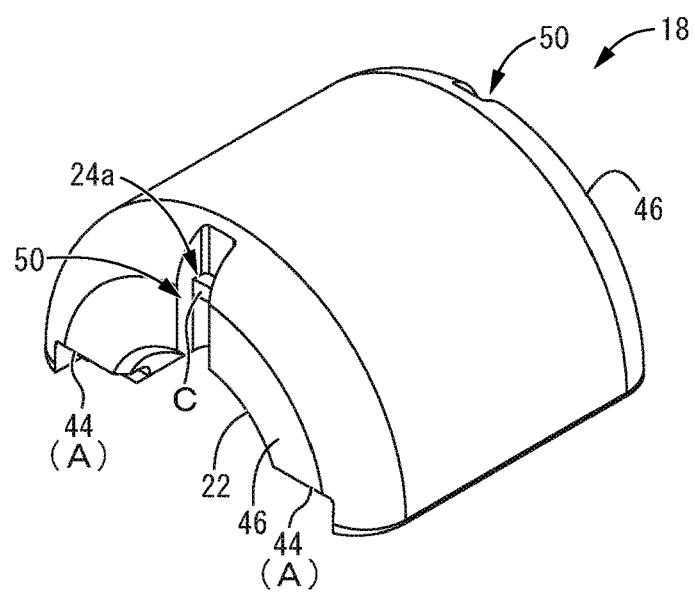
FIG. 2 is a perspective view showing one elastic half body constituting the stabilizer bushing shown in FIG. 1.

First, FIGS. 1 and 2 show a stabilizer bushing 10 as a first practical embodiment of a tubular vibration-damping device according to the present invention in a mounted state on a stabilizer bar 12. The stabilizer bushing 10 allows the stabilizer bar 12 to be supported by a vehicle body in a vibration-damping manner. In the following description, the axial direction refers to the direction perpendicular to the paper surface of FIG. 1 which is the center axis direction of the stabilizer bushing 10 and the stabilizer bar 12. Besides, the vertical direction refers to the vertical direction in FIG. 1, but does not always coincide with the vertical direction of the vehicle.

Described more specifically, the stabilizer bushing 10 is formed of a thick tubular rubber elastic body 14 overall, and includes a circular inner hole 16 penetrating in the axial direction roughly on its central axis. The rubber elastic body 14 is vertically divided, and has a structure in which a first elastic half body 18 located on the upper side and a second elastic half body 20 located on the lower side have roughly the same axial length, and their lower and upper surfaces are butted and combined with each other.

Figure 3:
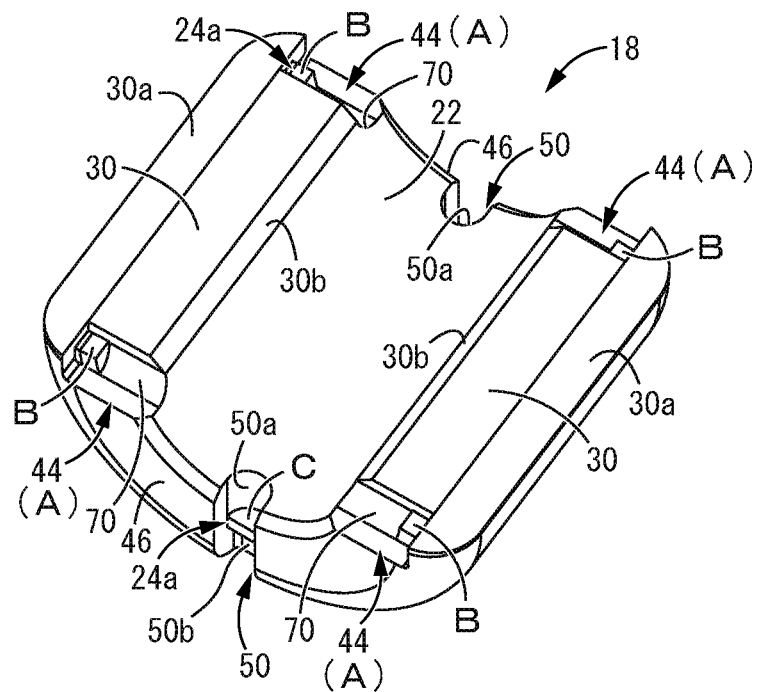
FIG. 3 is a perspective view showing the elastic half body shown in FIG. 2 from the bottom face side.
Figure 4:
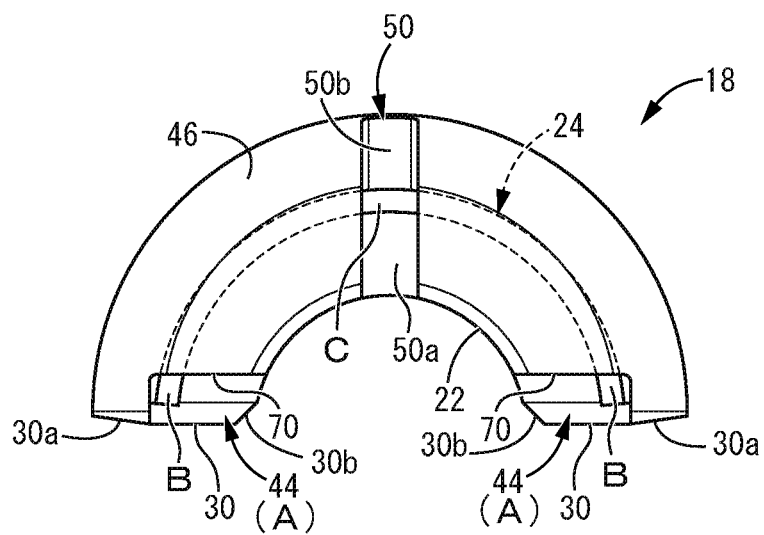
FIG. 4 is a front view of the elastic half body shown in FIG. 2.

As shown in FIGS. 2 to 4, the first elastic half body 18 has a semicircular tube shape extending straight in the axial direction overall, and has a downward concave groove shape having a center of curvature below the first elastic half body 18. The first elastic half body 18 includes a first concave groove 22 that extends continuously across the entire length in the axial direction with a semicircular cross section at the center of the lower surface thereof in the width direction (left-right direction in FIG. 4).

Figure 5:
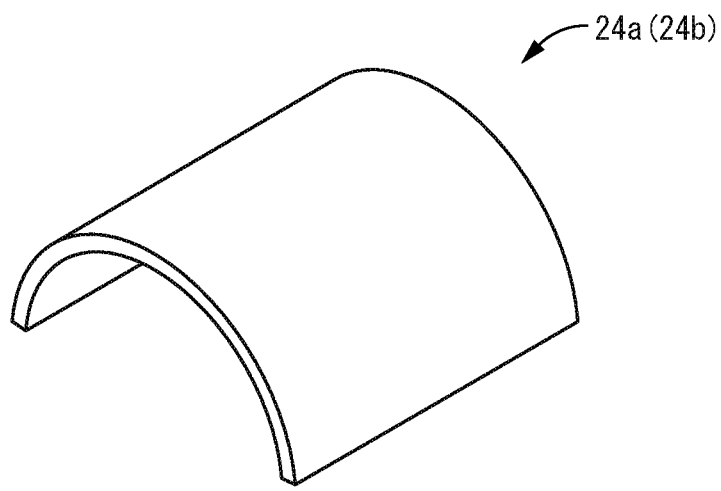
FIG. 5 is a perspective view of an intermediate plate fitting constituting the stabilizer bushing shown in FIG. 1.

An intermediate plate fitting 24a is arranged in an embedded state in the radially middle portion of the first elastic half body 18 (not limited to the radial center but at any portion radially between the inner circumferential surface and the outer circumferential surface thereof). In the present practical embodiment, the first elastic half body 18 is an integrally vulcanization molded component including the intermediate plate fitting 24a. As shown in FIG. 5, the intermediate plate fitting 24a has a curved plate shape curved in a semicircular tube shape with a center of curvature which is roughly the same as that of the inner circumferential surface of the first elastic half body 18. The intermediate plate fitting 24a may be appropriately provided with a hole, a notch, and the like that integrally connects the elastic bodies on the inner and outer surfaces thereof.

The circumferential length of the intermediate plate fitting 24a is shorter than the circumferential length of the first elastic half body 18 at the position where the intermediate plate fitting 24a is arranged. The axial length of the intermediate plate fitting 24a is shorter than the axial length of the first elastic half body 18. With this configuration, the intermediate plate fitting 24a is substantially embedded in the inside of the first elastic half body 18 without any edge protruding in the circumferential direction and in the axial direction.

In addition, each of the two circumferential end faces 30, 30 of the first elastic half body 18 is configured such that the radially inner side slightly projects in the circumferential direction of the first elastic half body 18 in comparison with the radially outer side. The radially inner side of the position where the intermediate plate fitting 24a is embedded projects further in the circumferential direction as a whole than the radially outer side, and the radially outer side of the position where the intermediate plate fitting 24a is embedded comprises an outer side sloping face 30a that gradually projects in the circumferential direction from the outer side toward the inner side in the radial direction. Besides, in combination with the fact that the radial dimension is larger on the radially inner side than on the radially outer side of the intermediate plate fitting 24a, the amount of projection of the first elastic half body 18 in the circumferential direction at the circumferential end face 30 is larger on the radially inner side than on the radially outer side of the intermediate plate fitting 24a. The radially inner end of the circumferential end face 30 comprises a chamfered inner edge sloping face 30b, but has a smaller radial dimension than the outer side sloping face 30a.

Figure 6:
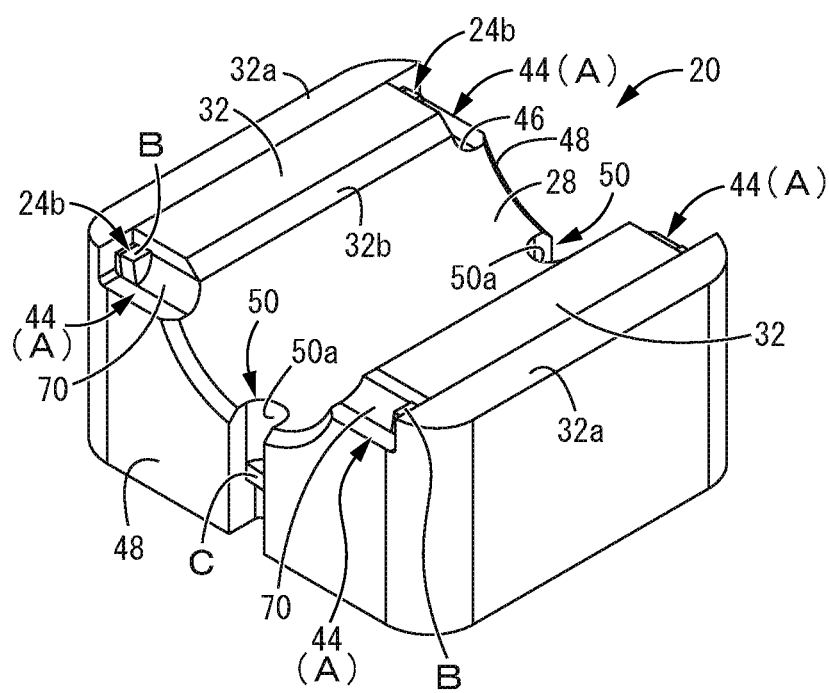
FIG. 6 is a perspective view showing the other elastic half body constituting the stabilizer bushing shown in FIG. 1.
Figure 7:
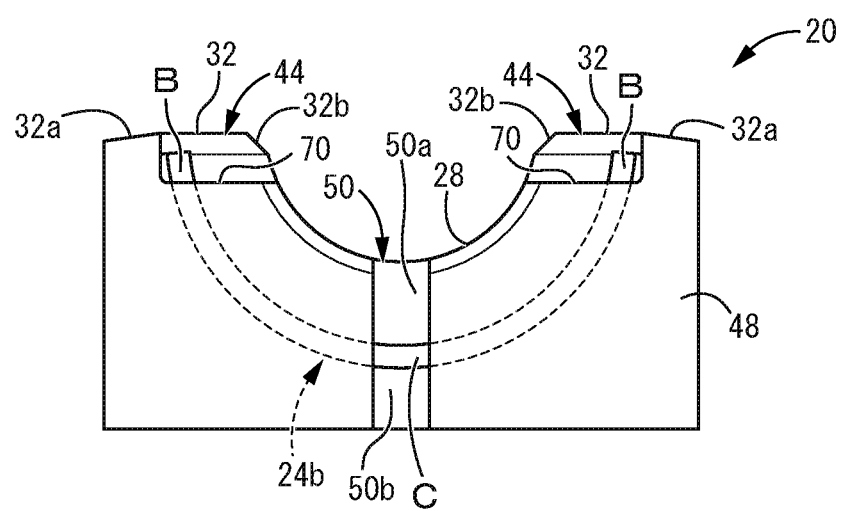
FIG. 7 is a front view of the elastic half body shown in FIG. 6.

As shown in FIGS. 6 and 7, the second elastic half body 20 has a semicircular tube shape extending straight overall roughly in the same manner as the first elastic half body 18. The inner circumferential surface of the second elastic half body 20 has an upward concave groove shape having a center of curvature above the second elastic half body 20. That is, the second elastic half body 20 includes a second concave groove 28 that extends continuously across the entire length in the axial direction with a semicircular cross section at the center of the upper surface thereof in the width direction (left-right direction in FIG. 7). The outer circumferential surface of the second elastic half body 20 is roughly box-shaped, and its lower surface comprises a rectangular, flat attachment surface for a vehicle.

Also, similarly to the first elastic half body 18, an intermediate plate fitting 24b is arranged in an embedded state in the radially middle portion of the second elastic half body 20 as well. The intermediate plate fitting 24b has a curved plate shape of semicircular tube that is substantially the same as the above-described intermediate plate fitting 24a when vertically inverted. In the present practical embodiment, the second elastic half body 20 is an integrally vulcanization molded component including the intermediate plate fitting 24b.

In the integrally vulcanization molded component of the second elastic half body 20, similarly to the integrally vulcanization molded component of the first elastic half body 18, the intermediate plate fitting 24b is substantially embedded in the inside of the second elastic half body 20 without any edge protruding in the circumferential direction and in the axial direction.

Also, each of the two circumferential end faces 32, 32 of the second elastic half body 20, similarly to the two circumferential end faces 30, 30 of the first elastic half body 18, is configured such that the radially inner side slightly projects in the circumferential direction of the second elastic half body 20 in comparison with the radially outer side. Moreover, similarly to the circumferential end face 30 of the first elastic half body 18, in the circumferential end face 32 of the second elastic half body 20, the radially outer portion comprises an outer side sloping face 32a, while the radially inner end comprises an inner edge sloping face 32b.

By the two circumferential end faces 30, 30 of the first elastic half body 18 and the two circumferential end faces 32, 32 of the second elastic half body 20 being combined so as to be butted and overlapped with each other, the rubber elastic body 14 is constituted. In addition, the opening surfaces of the first concave groove 22 and the second concave groove 28 each having a semicircular shape are overlapped with each other, thereby providing the circular inner hole 16 penetrating the roughly center of the rubber elastic body 14 in the axial direction.

The stabilizer bar 12 is disposed in the inner hole 16 of the rubber elastic body 14 in an inserted state, and the outer circumferential surface of the stabilizer bar 12 is bonded and attached to the inner circumferential surface of the inner hole 16 of the rubber elastic body 14. Meanwhile, a bracket 34 is overlapped on the outer circumferential surface of the rubber elastic body 14, and the bracket 34 is fixed to a vehicle-body side member 36, so that the stabilizer bar 12 is supported in a vibration-damping manner on the vehicle body.

While no particular limitation is imposed as to the shape of the bracket 34, in the present practical embodiment, the bracket 34 includes a mounting part 38 in a roughly U shape (a roughly inverted U shape in FIG. 1) corresponding to the outer circumferential surface of the rubber elastic body 14, and attachment parts 40, 40 of flat plate shape projecting in mutually opposite directions from the opening end of the mounting part 38. The bracket 34 is mounted onto the rubber elastic body 14 so as to be superposed from the first elastic half body 18 side, and to abut and cover the outer circumferential surface of the first elastic half body 18 as well as two side surfaces of the second elastic half body 20. In addition, the bracket 34 is fixed to the vehicle-body side member 36 by attachment bolts 42, 42 or the like at the attachment parts 40, 40, so that the stabilizer bushing 10 comprising the first and second elastic half bodies 18, 20 is mounted in a compressed state between the mounting part 38 of the bracket 34 and the vehicle-body side member 36, thereby supporting the stabilizer bar 12 on the vehicle body in a vibration damping manner.

In the assembled state of the first and second elastic half bodies 18, 20, the first and second elastic half bodies 18, 20 are mutually compressed in the direction of butting, so that compression force is mutually exerted on the two circumferential end faces 30, 30 (32, 32). In particular, in a region that projects from the position where the intermediate plate fitting 24a, 24b are embedded to both sides in the circumferential direction, binding force of the intermediate plate fitting 24a, 24b is reduced and compressive deformation occurs, so that the outer side sloping faces 30a, 32a and the inner edge sloping faces 30b, 32b of the circumferential end faces 30, 32 almost disappear. As a result, as shown in FIG. 1, with respect to the rubber elastic body 14 comprising the first and second elastic half bodies 18, 20, the entire circumferential length of the inner circumferential surface is in close contact with the outer circumferential surface of the stabilizer bar 12 across the entire circumferential length thereof with roughly no gap, while the entire circumferential length of the outer circumferential surface is in close contact with the bracket 34 and the vehicle-body side member 36 across the entire circumferential length thereof with roughly no gap.

Here, as shown in FIGS. 3 and 6, in the two circumferential end faces 30, 30 of the first elastic half body 18 and in the two circumferential end faces 32, 32 of the second elastic half body 20, a recess 44 is provided so as to be located at two axial ends of each circumferential end face 30 (32). Moreover, in two axial end faces 46, 46 of the first elastic half body 18 and in two axial end faces 48, 48 of the second elastic half body 20, a second recess 50 is provided so as to be located at each circumferentially center portion.

Hereinafter, the recess 44, the second recess 50, and the like of the first elastic half body 18 will be described, but as will be apparent from FIGS. 3 and 6, the description below similarly applies to the recess 44, the second recess 50, and the like of the second elastic half body 20.

Each recess 44 is located at a total of four corners A where each circumferential end face 30 and each axial end face of the first elastic half body 18 are connected to each other, and formed in a notch shape as if the corner A is gouged, while opening astride the circumferential end face 30 and the axial end face. The recess 44 of the present practical embodiment extends in a recessed groove shape from the radially middle portion toward the radially inner side at each corner A extending roughly in the radial direction, and opens to the inner circumferential surface (first concave groove 22) of the first elastic half body 18 but does not open to the outer circumferential surface thereof.

Each recess 44 has a recessed groove shape extending in the radial direction, and extends radially outward from the inner circumferential surface (first concave groove 22) of the first elastic half body 18. The corner B of the axial ends of the circumferential end portions of the intermediate plate fitting 24a is exposed at the bottom surface of the recess 44 near the radially outer end. The exposed corner B of the intermediate plate fitting 24a is exposed in a size that fits in the recess 44 without jutting out from the recess 44.

Meanwhile, each second recess 50 has a recessed groove shape opening onto each axial end face, and extends in the radial direction astride the inner circumferential surface and the outer circumferential surface of the first elastic half body 18. The second recess 50 of the present practical embodiment opens to the inner and outer circumferential surfaces of the first elastic half body 18 at two radial ends.

Besides, at a roughly central portion in the radial direction of the first elastic half body 18 in the second recess 50, the axial end C of the circumferentially middle portion of the intermediate plate fitting 24a is exposed from the bottom surface of the second recess 50 so as to protrude. The exposed axial end C of the intermediate plate fitting 24a is exposed in a size that fits in the second recess 50 without jutting out from the second recess 50.

The intermediate plate fitting 24a is configured to be positioned and supported within the mold cavity of the first elastic half body 18 at a total of four corners B exposed in a total of four recesses 44 and at a total of two axial ends C exposed in a total of two second recesses 50.

Figure 8A:
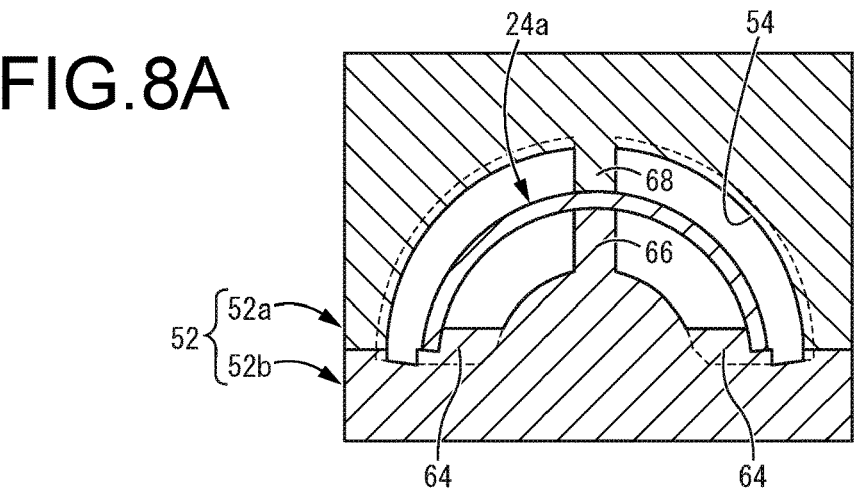
Figure 8B:
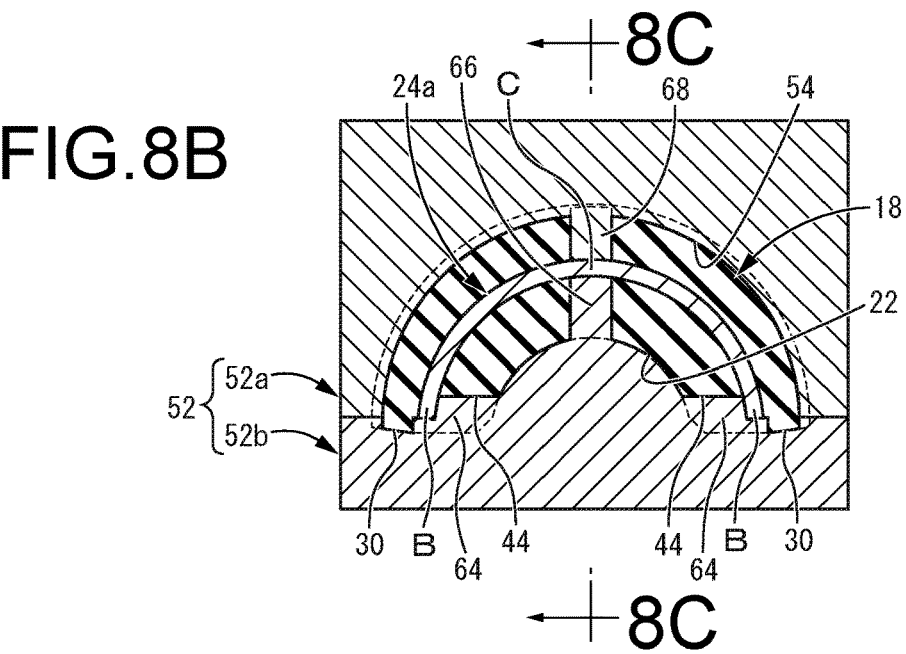
Figure 8C:
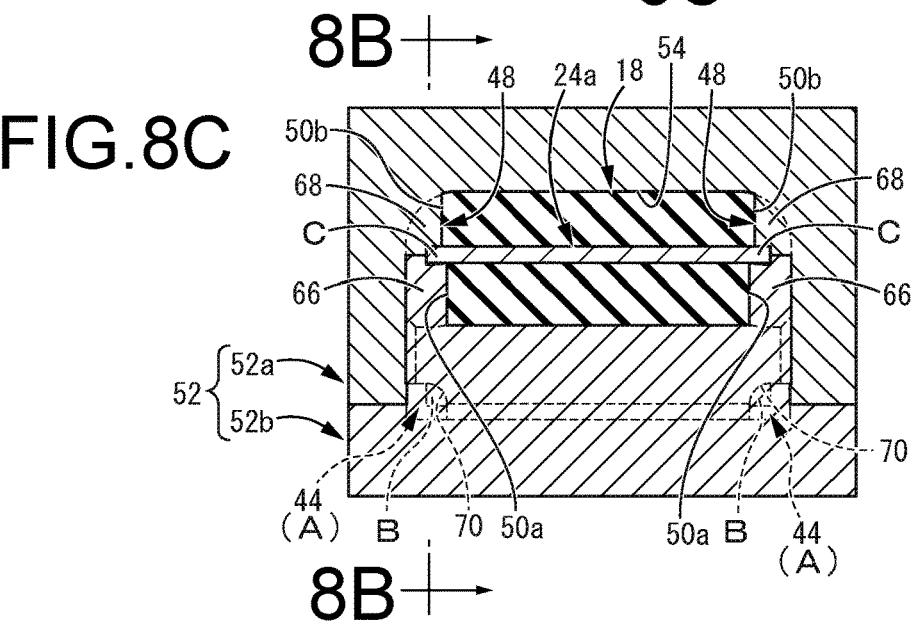

That is, as shown in FIGS. 8A to 8C, for example, the first elastic half body 18 can be manufactured by using a mold 52 comprising an upper mold 52a and a lower mold 52b of vertically parted structure, and filling a molding material into a mold cavity 54 formed between the mold mating surfaces and performing a process of vulcanization molding and the like.

At this time, the intermediate plate fitting 24a is set in the mold cavity 54 with the curved concave surface facing downward, and the four corners of the intermediate plate fitting 24a are configured to be positioned by being overlapped on respective positioning convex parts 64 provided at the four corners of the mold cavity 54 in the lower mold 52b in a state of contact at the circumferential end face, the inner circumferential face, and the axial end face. Furthermore, at the two axial ends of the mold cavity 54, there are provided center supporting convex parts 66, 68 located at the circumferential center and projecting in the vertical direction from one of the upper and lower molds 52a, 52b toward the other. The two axial ends of the intermediate plate fitting 24a are configured to be positioned in the vertical direction by being pinched between the center supporting convex parts 66, 68 at the circumferentially center portion.

In this way, by setting the intermediate plate fitting 24a in the mold cavity 54 with the curved inner surface facing downward, it is easy to more stably set and support the intermediate plate fitting 24a at a predetermined position in the mold cavity 54 than in the case of setting the intermediate plate fitting 24a in an inverted orientation with the curved inner surface facing upward. In the present practical embodiment in particular, by adopting the center supporting convex part 68 for positioning the intermediate plate fitting 24a so as to press the intermediate plate fitting 24a from above at the circumferentially middle portion, upward movement of the intermediate plate fitting 24a is also limited. Thus, it is not necessary to provide, for example, a holding pin or the like to the upper mold 52a for holding the center portion of the intermediate plate fitting 24a from above, while avoiding generation of an inner space within the first elastic half body 18 due to such a holding pin.

In the present practical embodiment, the corner B of the intermediate plate fitting 24a is positioned at the radially outer end in the concave groove-shaped recess 44 formed by the positioning convex part 64 of the mold 52 and extending in the radial direction. Since the recess 44 is not provided on the radially outer side of the corner portion B of the intermediate plate fitting 24a but the rubber elastic body exists in a filled state, a simple structure of the mold 52 or the like can be achieved.

Furthermore, the concave groove-shaped recess 44 formed by the positioning convex part 64 of the mold 52 and extending in the radial direction has a groove bottom face comprising a curved bottom face 70 extending in the radial direction with an inner surface shape of curved concave. That is, the recess 44 includes two surfaces orthogonal to each other, namely, a surface roughly perpendicular to the circumferential end face 30 of the first elastic half body 18 and a surface roughly perpendicular to the axial end face 46 of the first elastic half body 18, and is provided so as to notch the corner A of the first elastic half body 18. However, the bottom corner of the recess 44, which is the intersection of the two orthogonal surfaces, comprises the curved bottom face 70 of arcuate shape that smoothly connects the two orthogonal surfaces.

Since the bottom corner of the recess 44 is not a right-angled intersecting face but the curved bottom face 70 in this way, the following technical effects (i) to (iii) can be exhibited, for example.

(i) It is possible to obtain a sufficient rubber volume by reducing the volume of the recess 44 while ensuring the positioning function of the intermediate plate fitting 24a/24b.

(ii) When the first and second elastic half bodies 18, 20 are combined and bonded to the outer circumferential surface of the stabilizer bar 12, it is possible to efficiently obtain sufficient pushing force at the axial end, which is important for stable bonding.

(iii) During an external input applied under the mounted state onto the stabilizer bar 12, it is possible to reduce the concentration of stress and strain so as to improve the durability.

Figure 9:
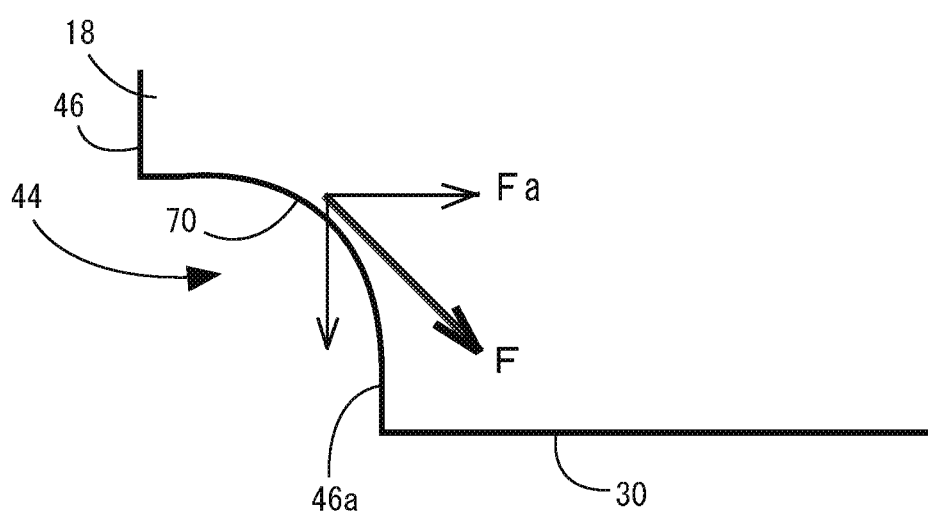
FIG. 9 is a view suitable for explaining the vicinity of the recess of the elastic half body shown in FIG. 2.

Particularly with respect to the effect (ii) above, at the axial end having a free surface larger than that of the axial center, it is important to obtain a sufficient pushing force in the inner circumferential surfaces of the first and second elastic half bodies 18, 20 against the surface of the stabilizer bar 12. In particular, at the butted portions of the two circumferential end faces 30, 32 of the first and second elastic half bodies 18, 20, the free surface is further enlarged by being divided in the circumferential direction, and in addition, due to the formation of the recess 44 for positioning the intermediate plate fitting 24a/24b, the free surface of the said portion is further increased. Thus, there is concern about bonding defects, peeling of the bonding or the like due to a decrease in the pushing force. Here, in the present practical embodiment, as illustrated in FIG. 9, the bottom corner of the recess 44 comprises the curved bottom face 70. Thus, the force F, which is applied to the formation site of the recess 44 by the first and second elastic half bodies 18, 20 being butted at each other, is transmitted and allowed to act in the tangential direction of the curved bottom face 70, so as to have a component force Fa in the direction of pressing the axial end face 46a in the recess 44 inward in the axial direction. As a result, at the time of attachment to the stabilizer bar 12, it is possible to suppress the escape of the pushing force due to the swelling deformation of the axial end face 46a of the recess 44 toward the axial outside, and to exert an effective compression force on the butted portions of the first and second elastic half bodies 18, 20. Accordingly, an effective pushing force can be stably exerted on the inner circumferential surfaces of the first and second elastic half bodies 18, 20 at the bonded site to the outer circumferential surface of the stabilizer bar 12, thereby obtaining a good bonded state.

In addition, in the first and second elastic half bodies 18, 20 of the present practical embodiment, at the two circumferential end faces 30, 32 butted at each other, the radially inner sides of the intermediate plate fittings 24a, 24b project in the circumferential direction further than the radially outer sides comprising the outer side sloping faces 30a, 30b. With this configuration, a large compressed rubber volume is obtained between the butted surfaces of the first and second elastic half bodies 18, 20. Moreover, the compressed rubbers between the butted surfaces of the first and second elastic half bodies 18, 20 are provided so as to project in the circumferential direction, which is the direction of butting, further than the circumferential end faces of the intermediate plate fittings 24a, 24b. This makes it possible to obtain a larger volume of the rubber compressed at the butted portions of the first and second elastic half bodies 18, 20, and the compressed elastic body is pushed inward rather than outward in the radial direction. As a result, at the butted portions of the first and second elastic half bodies 18, 20, the pushing force against the bonding surface to the stabilizer bar 12 can be more efficiently obtained.

Moreover, regarding the effect (iii) above as well, as described in the effect (ii) above, the butted portions of the first and second elastic half bodies 18, 20 are bonded in a compressed state with a sufficient pushing force against the outer circumferential surface of the stabilizer bar 12. Therefore, even when various external forces such as the ones in the radial direction, in the axial direction, in the prizing direction, and in the torsional direction are applied, the generation of tensile stress at the bonded site with the stabilizer bar 12 can be reduced or avoided, thereby improving durability. In addition, since the bottom corner of the recess 44 comprises the curved bottom face 70, concentration of stress and strain during deformation can be reduced or avoided in comparison with the case where the bottom corner has a right-angled shape. Thus, further improvement in durability can be achieved.

Furthermore, in the present practical embodiment, in the second recess 50, with respect to a radial inside portion 50a extending to the radially inner side than the intermediate plate fitting 24a/24b as well, the bottom surface comprises a roughly semicircular curved inner surface, so that the radial inside portion 50a has a concave groove structure extending in the radial direction with a concave curved bottom face. With this configuration, when a radial compression force is applied from the intermediate plate fitting 24a/24b to the radially inner side at the time of attachment to the stabilizer bar 12, localized concentration of stress and strain in the peripheral wall of the second recess 50 is avoided. As a result, a stable pressing force is applied to the stabilizer bar 12 around the second recess 50 as well, so that an excellent bonding process to the stabilizer bar 12 can be stably performed. Besides, concentration of stress and strain during exertion of an external force is reduced, and the durability can also be improved.

Note that in the present practical embodiment, in the second recess 50, the bottom part of a radial outside portion 50b extending to the radially outer side than the intermediate plate fitting 24a/24b has a square shape with a flat bottom surface. However, like the radial inside portion 50a described above, the radial outside portion 50b may also be formed with a concave curved bottom face.

Although the practical embodiment of the present invention has been described above, the present invention is not limitedly interpreted based on the specific or restrictive description in the practical embodiment and in the summary section, but may be embodied with various changes, modifications and improvements which may occur to those skilled in the art.

For example, in the above-described practical embodiment, the recess 44 opens only onto the inner circumferential surface of the first and second elastic half bodies 18, 20. However, the recess 44 may be formed as a recess extending across the radially entire length of the circumferential end of the first and second elastic half bodies 18, 20, and the recess may open not only onto the inner circumferential surface but also onto the outer circumferential surface.

Moreover, in the present invention, the second recess is not essential, and it would also be possible to adopt, for example, a positioning mechanism such as a holding pin for holding from above the roughly central portion of the intermediate plate fitting set in the mold cavity in a state of facing downward as described above, instead of or in addition to the positioning mechanism of the intermediate plate fitting by the second recess.

Furthermore, the inner surface shape of curved concave adopted in the bottom corner of the recess in the present invention does not need to have a constant radius of curvature in its entirety, and may include a straight portion. For example, it would also be possible to adopt an inner surface shape of curved concave that extends roughly straightly with a very large radius of curvature, or an inner surface shape of curved concave that has a curved concave face only at one end or the other end of a sloping face such as a chamfered face, as the bottom corner of the recess. Even with the bottom corner having such a roughly straight sloping face, the compression force applied from the outer circumferential surfaces of the first and second elastic half bodies acts so as to have a component force in the axially inward direction along the sloping face. Thus, it is possible to obtain the same working effects as in the preceding practical embodiment in which the recess having the inner surface shape of arcuate curved concave is adopted.

What is claimed is:

1. A stabilizer bushing comprising:
a stabilizer bar; and
two elastic half bodies of semi-tubular shape each including an intermediate plate fitting of semicircular arc shape embedded therein, the elastic half bodies being bonded and attached to an outer circumferential surface of the stabilizer bar such that two circumferential end faces of one of the elastic half bodies are butted at those of another of the elastic half bodies, wherein
the intermediate plate fitting is in an embedded state in an axial direction in each elastic half body,
a recess of notch shape is provided in a corner of each of axial ends of each circumferential end face of each elastic half body, each recess extending in a radial direction of each elastic half body and opening onto an inner circumferential surface thereof, and a corner of each of axial ends of each of circumferential end portions of the intermediate plate fitting is exposed at each recess, and
a bottom corner of each recess extending in the radial direction of each elastic half body has an inner surface shape of curved concave.

2. The stabilizer bushing according to claim 1, wherein each recess opens only onto the inner circumferential surface of each elastic half body.

3. The stabilizer bushing according to claim 1, further comprising a second recess of notch shape provided at each of axial ends of a circumferentially middle portion of each elastic half body that includes each recess, the second recess extending in the radial direction of each elastic half body and opening onto the inner circumferential surface thereof, wherein
an axial end of a circumferentially middle portion of the intermediate plate fitting is exposed at the second recess, and
a bottom part of the second recess extending in the radial direction of each elastic half body has an inner surface shape of curved concave.

4. The stabilizer bushing according to claim 1, wherein two circumferential end portions of each elastic half body project in a circumferential direction further than circumferential end portions of the intermediate plate fitting, and an amount of projection in the circumferential direction is larger on a radially inner side than on a radially outer side of a radially middle portion where the intermediate plate fitting is positioned.

* * * * *